A. P. BRUSH.
CONE COUPLING.
APPLICATION FILED APR. 8, 1915.
1,195,971.
Patented Aug. 29, 1916.
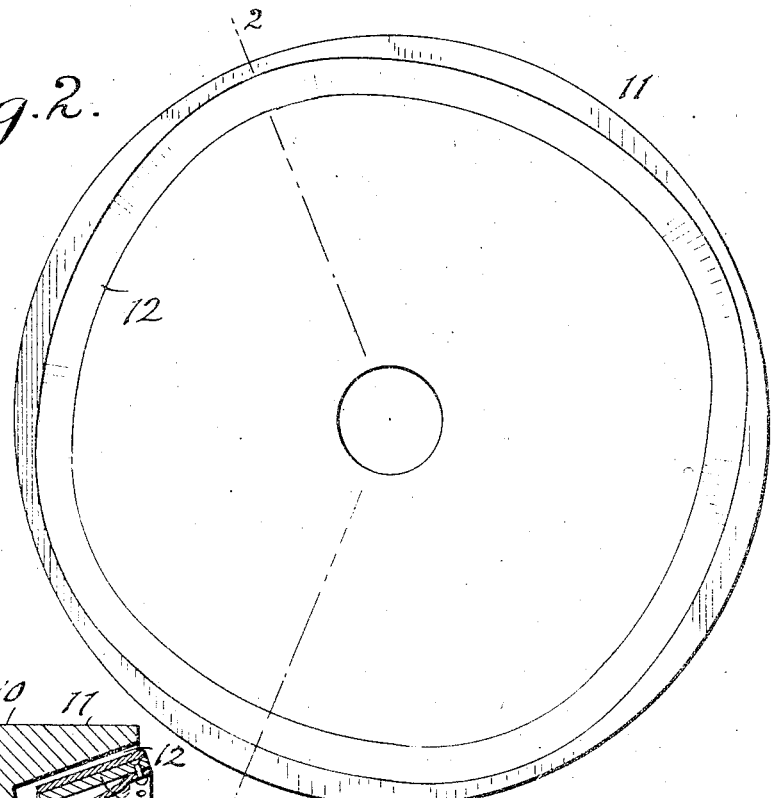
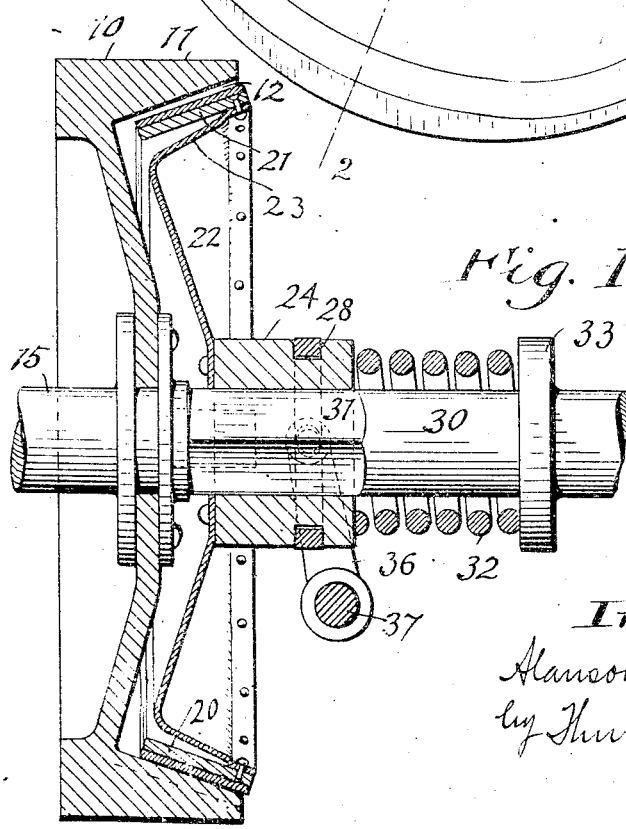
Inventor.
Alanson P. Brush
by Thurston & Kwis
attorneys

UNITED STATES PATENT OFFICE.

ALANSON P. BRUSH, OF DETROIT, MICHIGAN.

CONE-COUPLING.

1,195,971.  Specification of Letters Patent.  Patented Aug. 29, 1916.

Application filed April 8, 1915. Serial No. 19,859.

*To all whom it may concern:*

Be it known that I, ALANSON P. BRUSH, a citizen of the United States, residing at Detroit, in the county of Wayne and State of Michigan, have invented a certain new and useful Improvement in Cone-Couplings, of which the following is a full, clear, and exact description.

This invention relates to friction couplings for connecting two relatively rotatable members in order to bring about a common state of rest or motion, as the case may be. If both of said members are rotatable, the coupling will be what is specifically known as a friction clutch, and its function will be to cause said members to rotate in substantial unison. If only one of said members is rotatable, the coupling will be what is specifically known as a brake, whose function will be to check or entirely stop the rotation of said rotatable member.

The invention is an improvement in the type of friction couplings which are known as cone couplings.

The objects of the invention are to provide an efficient cone coupling which will not cause the sudden starting of the previously non-rotating member, if the invention is embodied in a clutch, or the sudden stopping of the previously rotating member if the invention is embodied in a brake. Also to prevent the two friction surfaces from sticking together so that their separation is either impossible or difficult.

The underlying novel characteristic of the invention is the employment of one rigid inelastic member having its friction surface in the form of a symmetrically warped cone surface, and an elastic easily bent conical ring, whose surface is adapted to be forced into contact with said warped conical surface, with the result of causing said elastic cone ring to be deflected out of its normal conical form and to be caused to assume more or less nearly the form of the warped conical surface with which it is engaging.

The invention embodied in a practical form and associated with mechanism which adapts it specifically for use as a friction clutch is shown in the accompanying drawings, is hereinafter described, and is formally defined by the appended claims.

In the drawing, Figure 1 is a central longitudinal section or a friction clutch embodying the invention, and Fig. 2 is a view of the rigid member having the warped cone surface, said view being from the right side of said member as shown in Fig. 1.

Referring to the parts by letters, 15 and 30 represent two alined rotatable shafts; 10 represents one of the members of the coupling, which is fixed to the rotatable shaft 15. This member has an annular flange 11, whose inner surface 12 is warped substantially as shown in Fig. 2, that is to say, the inner and approximately conical surface of this flange is formed of a plurality of equal segments which respectively approach and recede from the axis of rotation. The other friction member includes an elastic conical ring 20 and a wheel 22 with which said ring has a driving connection, which wheel has a hub 24 in which is a squared hole that fits over a squared part 31 of the shaft 30, whereby this member 22 has a driving connection with the shaft, but is nevertheless capable of being moved lengthwise thereon. In the particular construction shown, this wheel 22 is formed with a conical flange 23 which is made of thin and therefore sufficiently flexible steel; and the conical ring 20 is riveted to this flange at intervals near their wide ends. This cone ring 20 is to be made of flexible spring steel sufficiently thin to enable it to be deformed by contact with the deformed or warped inner approximately conical surface 12 of the member 10. A spring 32 is employed to move the member of which the said ring 20 is a part, along shaft 30. This spring may be compressed between the flange 33 on said shaft and the end of the hub 23 of said member. The spring induced movement of said clutch member will cause the engagement of the outer conical surface of the ring 20 with the inner and approximately conical but actually warped inner surface of the flange 10. A ring 34 may be rotatably mounted in an annular groove 28 formed in the hub 24, and this may be engaged by arms 36 fixed to a rock shaft 37, and thereby the hub 24 and the parts carried thereby may be moved in opposition to the spring 32, and thereby disengage the friction surfaces referred to.

In order to understand clearly in what manner the described parts coöperate to produce the desired result, it must be remembered that one of the shafts 15 and 30 is turning relatively to the other when the spring 32 is allowed to act to cause the engagement of the flexible cone ring 20 with the warped conical surface of the rigid member 10. This spring 32 should be so strong that, when this engagement takes place, the ring 20 will be distorted more or less by reason of its engagement with the distorted surface 12. So long as there is relative rotation of the two engaging surfaces this distortion of the ring 20 will progress around said ring, that is to say, said ring will have an undulatory movement of distortion around the axis of rotation. The action of the spring is such that the ring will be caused to slowly work its way into the warped female cone. This will necessarily increase the distortion of the ring 20, and will also increase the area of the contacting surfaces of said two parts. The increasing friction due to the increase in area of the contacting surfaces, and the increasing resistance of the ring 20 to the undulatory distortion, will soon cause the two relatively rotatable parts to come to a common state of rest or motion as the case may be. This result will come rather more quickly than with an ordinary cone coupling, but it will never come with a jerk. It is not at all probable that the ring 20 will ever be distorted to such a degree that its entire outer surface will be in contact with the warped surface 12. Therefore, said parts will not stick together. In fact, the inherent resiliency of the ring 20 will aid in releasing said parts from contact when by the rocking of the rock shaft 37 the movable clutch member is moved away from the member 10.

Having described my invention, I claim:

1. In a cone coupling, the combination of two relatively rotatable parts, viz., a wheel having an annular flange the inner surface of which is in the form of a symmetrical warped cone, and a flexible cone ring lying within said flange, and means for causing said cone ring to be pressed into contact with the inner distorted conical surface of said flange.

2. In a cone coupling, the combination of a wheel having an annular flange whose inner surface is in the form of a symmetrically warped cone, a flexible cone ring lying within said flange and being held unsupported except adjacent to its edge of largest diameter, a second wheel which is axially disposed with respect to the flanged wheel and is rotatable independently thereof and which enters and contacts and is rigidly connected with said cone ring adjacent the large diameter edge thereof.

In testimony whereof, I hereunto affix my signature in the presence of two witnesses.

ALANSON P. BRUSH.

Witnesses:
E. L. THURSTON,
A. J. HUDSON.